(12) United States Patent
Nakhuda et al.

(10) Patent No.: US 10,387,872 B2
(45) Date of Patent: Aug. 20, 2019

(54) BROWSER-BASED PAYMENT FOR CONTENT

(71) Applicant: Amazon Technologies, Inc., Seattle, WA (US)

(72) Inventors: Daryn Edward Nakhuda, Seattle, WA (US); Scott Kerns Windsor, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/181,481

(22) Filed: Nov. 6, 2018

(65) Prior Publication Data

US 2019/0073668 A1 Mar. 7, 2019

Related U.S. Application Data

(62) Division of application No. 13/780,015, filed on Feb. 28, 2013, now Pat. No. 10,152,710.

(51) Int. Cl.
*G06F 21/00* (2013.01)
*G06Q 20/38* (2012.01)
*G06Q 40/00* (2012.01)

(52) U.S. Cl.
CPC ....... *G06Q 20/3825* (2013.01); *G06Q 40/123* (2013.12)

(58) Field of Classification Search
CPC .................................................. G06Q 20/123
USPC .......................................................... 705/52
See application file for complete search history.

(56) References Cited

U.S. PATENT DOCUMENTS

2007/0274490 A1* 11/2007 Hu ........................ H04L 12/14
 379/201.01
2010/0037248 A1* 2/2010 Lo ...................... H04N 7/17327
 725/1

* cited by examiner

*Primary Examiner* — Ojo O Oyebisi
(74) *Attorney, Agent, or Firm* — Thomas | Horstemeyer, LLP (57) ABSTRACT

Disclosed are various embodiments for browser-based payment for content. A first request for content is sent to a network content server. A response protocol header is received indicating that a payment is sought for the content in response to the first request. Payment manager code integral to a browser or a browser plug-in is executed in response to receiving the response protocol header. A payment-signifying token is received from a payment provider in response to consummating the payment. A second request for the content is sent to the network content server, where the second request includes a request protocol header specifying the payment-signifying token. The content is received from the network content server in response to the second request.

20 Claims, 7 Drawing Sheets

BROWSER-BASED PAYMENT FOR CONTENT

CROSS-REFERENCE TO RELATED APPLICATIONS

This application is a division of, and claims priority to, U.S. patent application Ser. No. 13/780,015, titled "BROWSER-BASED PAYMENT FOR CONTENT," and filed on Feb. 28, 2013, which is incorporated herein by reference in its entirety.

BACKGROUND

Many network pages and other forms of network content require payment for access. For example, network sites for newspapers and magazines are increasingly erecting "paywalls" that charge users for access. Music files, video files, electronic books, and other forms of content often are subject to charges for access. When users attempt to access protected content, they are typically redirected to another network page that prompts them to authenticate and/or enter payment information. Alternatively, users who lack rights to access the content may simply be denied access and shown an error.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to facilitating payment for and access to protected content via a browser-based approach. Network content is typically accessed by entering or clicking on a uniform resource locator (URL) in a browser. If a user at a client does not have access to particular content, a hypertext transfer protocol (HTTP) server may return an error, such as unauthorized (status code 401) or forbidden (status code 403). A standard or customized error message may be presented to the user.

Alternatively, if the requested content corresponds to premium content that may be accessed for a fee, the client may be redirected to another network page that facilitates creating or logging into a user account and/or paying a fee to access the premium content. After authenticating and/or paying the fee, the client is associated with a certain state (e.g., a session cookie) that enables the client to access the premium content. Such an approach lacks a standardized implementation, and many network sites implement authentication and content payment in diverse ways.

Various embodiments of the present disclosure introduce approaches to simplify payment for protected or premium network content by augmenting the network protocol (e.g., HTTP or other protocol) and implementing support in the browser. When protected content is requested via a URL, protocol headers indicate that payment is required in order to access the protected content. Metadata provided in the protocol headers indicate various parameters defining what type of payment is sought. Code in the browser and/or a plug-in then facilitates payment via a payment provider. Upon payment, the browser obtains a payment-signifying token that may be employed in a subsequent request for the content through the same URL. In the following discussion, a general description of the system and its components is provided, followed by a discussion of the operation of the same.

Figure 1:
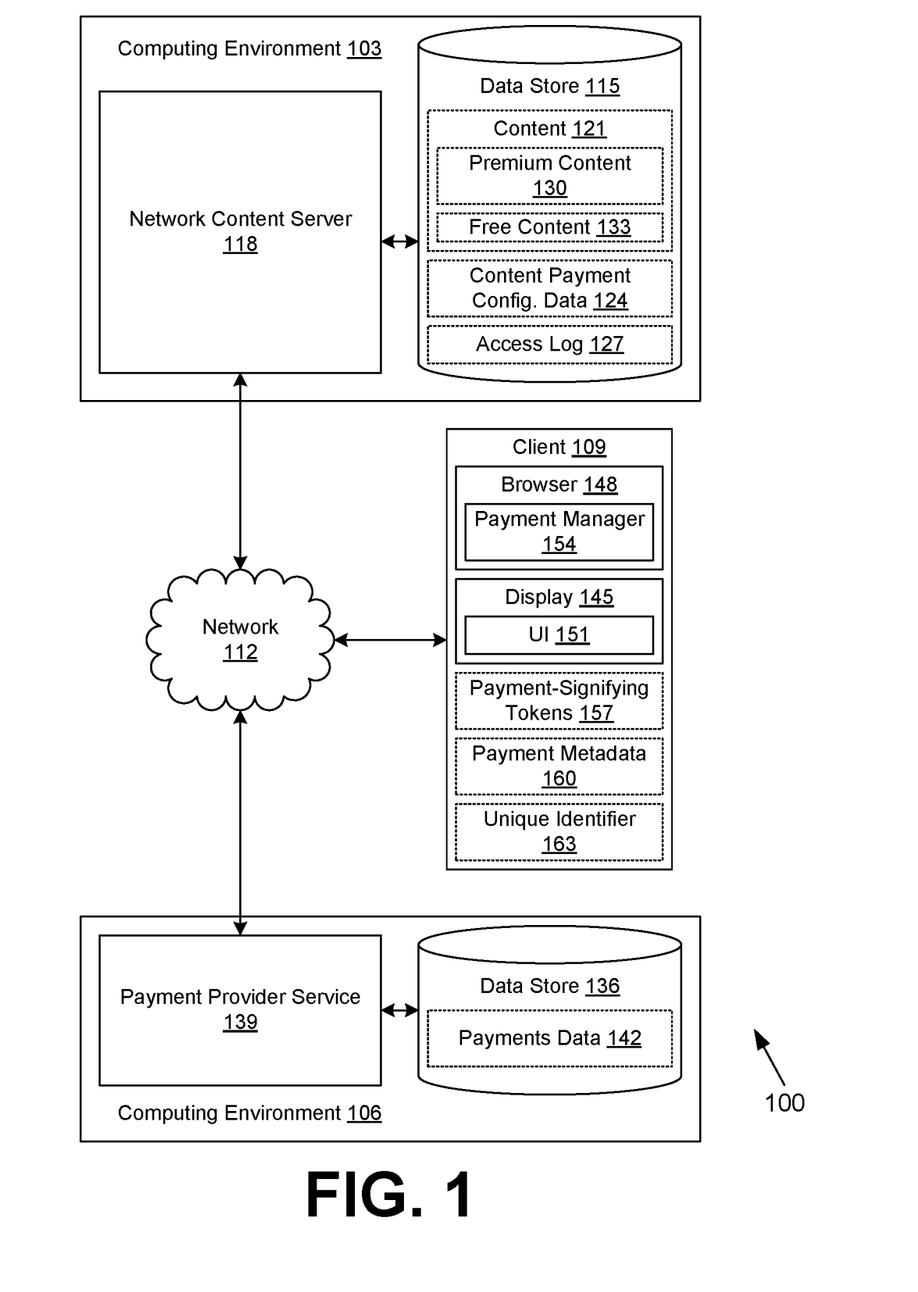
FIG. 1 is a drawing of a networked environment according to various embodiments of the present disclosure.

With reference to FIG. 1, shown is a networked environment 100 according to various embodiments. The networked environment 100 includes a computing environment 103, a computing environment 106, and one or more clients 109 in data communication via a network 112. The network 112 includes, for example, the Internet, intranets, extranets, wide area networks (WANs), local area networks (LANs), wired networks, wireless networks, or other suitable networks, etc., or any combination of two or more such networks.

The computing environment 103 may comprise, for example, a server computer or any other system providing computing capability. Alternatively, the computing environment 103 may employ a plurality of computing devices that are arranged, for example, in one or more server banks or computer banks or other arrangements. Such computing devices may be located in a single installation or may be distributed among many different geographical locations. For example, the computing environment 103 may include a plurality of computing devices that together may comprise a cloud computing resource, a grid computing resource, and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various embodiments. Also, various data is stored in a data store 115 that is accessible to the computing environment 103. The data store 115 may be representative of a plurality of data stores 115 as can be appreciated. The data stored in the data store 115, for example, is associated with the operation of the various applications and/or functional entities described below.

The components executed on the computing environment 103, for example, include a network content server 118 and other applications, services, processes, systems, engines, or functionality not discussed in detail herein. The network content server 118 is executed to serve up content requested via the network 112. To this end, the network content server 118 may correspond to a hypertext transfer protocol (HTTP) server or other server. The network content server 118 may be configured to enforce access restrictions on content to ensure that payment for the restricted content is made, as will be described.

The data stored in the data store 115 includes, for example, content 121, content payment configuration data 124, an access log 127, and potentially other data. The content 121 corresponds to files, streams, and/or other data resources that may be served up to clients 109 via the network 112. The content 121 may include network pages such as web pages, mobile application data, images, videos, audio, electronic books, software, documents, and/or other forms of digital content. The content 121 may be divided into premium content 130 and free content 133. The premium content 130 corresponds to digital content 121 for which payment is to be obtained before access is provided. The free content 133 corresponds to digital content 121 for which no payment is necessary.

The content payment configuration data 124 configures how access may be granted to the premium content 130. For example, the content payment configuration data 124 may define payment amounts, scopes of content access, duration of access that is granted, and/or other parameters. Different payment amounts may be requested depending on varying levels of access, including varied scope and duration.

The scope of content access may include one or more resource paths that may be made available in response to a particular payment amount. For example, the scope may define particular directories and/or resources using resource paths. Such resource paths may potentially include wildcards, e.g. "/movies/*.mpg" with "*" being a wildcard character. Such a resource path may grant access to all content 121 under the "/movies" directory, where the content 121 has a resource name ending in ".mpg." The scope of content access may define a quantity of unique clients 109 that may access the content 121 in response to a particular payment amount, a quantity of accesses permitted for the content 121 in response to a particular payment amount, a quantity of different content items that may be accessed, and/or other access characteristics.

The duration of access may control how long the content 121 may be accessed. For example, access may be restricted to a current 24 hour period, a current week, a current month, etc. Such a time period may be configured to begin upon a first access of the content 121, upon payment, or at another time. It is understood that charges for content 121 may also be based on other factors such as, for example, geographic location of the client 109, demographic characteristics of a user associated with a client 109, prior payment history of a user associated with a client 109 (including purchases, rentals, etc. for content 121), and/or other factors.

The access log 127 may track accesses to content 121 by clients 109. In this regard, the access log 127 may record payment-signifying tokens, unique identifiers associated with clients 109, dates and times associated with accesses, and/or other data that describes accesses. The access log 127 may be employed to limit access to content 121 to a predefined number of clients 109 for a particular payment-signifying token. The access log 127 may be employed to limit access to content 121 to a predefined number of total accesses for a particular payment-signifying token. The access log 127 may also be employed to enforce access duration restrictions based upon a time of first access.

The computing environment 106 may comprise, for example, a server computer or any other system providing computing capability. Alternatively, the computing environment 106 may employ a plurality of computing devices that are arranged, for example, in one or more server banks or computer banks or other arrangements. Such computing devices may be located in a single installation or may be distributed among many different geographical locations. For example, the computing environment 106 may include a plurality of computing devices that together may comprise a cloud computing resource, a grid computing resource, and/or any other distributed computing arrangement. In some cases, the computing environment 106 may correspond to an elastic computing resource where the allotted capacity of processing, network, storage, or other computing-related resources may vary over time. Although the computing environment 106 is described separately from the computing environment 103, it is understood that the computing environments 103 and 106 may correspond to the same environment in various embodiments. The computing environment 106 may have the same operator as the computing environment 103, or the computing environment 106 may have an operator different from the computing environment 103.

Various applications and/or other functionality may be executed in the computing environment 106 according to various embodiments. Also, various data is stored in a data store 136 that is accessible to the computing environment 106. The data store 136 may be representative of a plurality of data stores 136 as can be appreciated. The data stored in the data store 136, for example, is associated with the operation of the various applications and/or functional entities described below.

The components executed on the computing environment 106, for example, include a payment provider service 139 and other applications, services, processes, systems, engines, or functionality not discussed in detail herein. The payment provider service 139 is executed to receive and process payments from clients 109. After processing a payment, the payment provider service 139 generates a payment-signifying token that may be used by the network content server 118 to determine whether a client 109 has access to premium content 130. The payment provider service 139 may digitally sign such a token so that the source of the token may be verified. The payment provider service 139 may also perform verification of tokens for the network content server 118.

The data stored in the data store 136 includes, for example, payments data 142 and potentially other data. The payments data 142 tracks payment history for various clients 109 and the payment-signifying tokens associated with the clients 109. The payments data 142 may include data that facilitates invalidation of tokens that are stolen, invalid, misused, exhausted, and/or otherwise subject to invalidation.

The client 109 is representative of a plurality of client devices that may be coupled to the network 112. The client 109 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 109 may include a display 145. The display 145 may comprise, for example, one or more devices such as liquid crystal display (LCD) displays, gas plasma-based flat panel displays, organic light emitting diode (OLED) displays, LCD projectors, or other types of display devices, etc.

The client 109 may be configured to execute various applications such as a browser 148 and/or other applications. The browser 148 may be executed in a client 109, for example, to access network content served up by the computing environment 103 and/or other servers, thereby rendering a user interface 151 on the display 145. The browser 148 may include a payment manager 154 that manages payments to payment provider services 139 in order to facilitate access to content 121. The payment manager 154 may be integral to the browser 148 or may be a plug-in or extension for the browser 148.

The payment manager 154 may manage various payment-signifying tokens 157 that have been received so that they may be presented to network content servers 118 as appropriate to access premium content 130. The payment manager 154 may also track various payment metadata 160 that indicates the nature of access afforded to the particular payment-signifying tokens 157. A unique identifier 163 may be associated with the client 109 and/or the browser 148 and may be presented to a network content server 118 in conjunction with accessing premium content 130. The client 109 may be configured to execute applications beyond the browser 148 such as, for example, browsers, mobile applications, email applications, social networking applications, and/or other applications.

Figure 2:
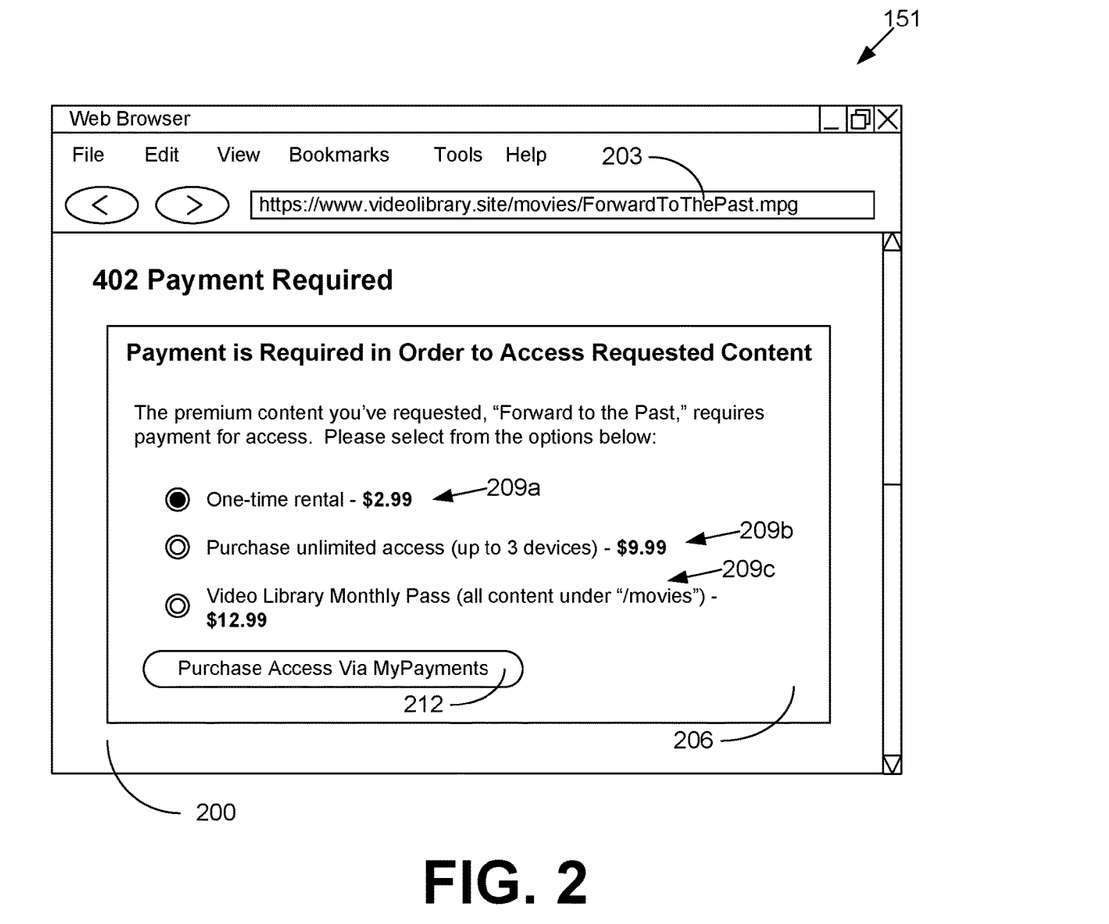
FIG. 2 is a drawing of an example of a user interface rendered by a client in the networked environment of FIG. 1 according to various embodiments of the present disclosure.

Continuing on to FIG. 2, shown is an exemplary user interface 151 rendered by a browser 148 (FIG. 1) executed by a client 109 (FIG. 1) in the networked environment 100 (FIG. 1) according to various embodiments. The user interface 151 shows a network page 200 that is obtained from a network content server 118 (FIG. 1) in response to a request for a resource identified by a URL 203. The URL 203 ("https://www.videolibrary.site/movies/ForwardToThePast.mpg") corresponds to a video resource that is premium content 130 (FIG. 1).

In this example, payment has not been made and an HTTP status code "402" has been returned by the network content server 118 in the response protocol headers. The status code "402" corresponds to "Payment Required." The response from the network content server 118 includes various payment metadata 160 (FIG. 1) that is employed by the browser 148 to render a payment interface 206.

The payment interface 206 enables the user to make a payment in order to access the premium content 130 at the URL 203. The payment interface 206 is rendered based upon the payment metadata 160, which may indicate payment alternatives, including payment amounts, scope of access, duration of access, and other characteristics. The payment interface 206 includes several exemplary access options 209a, 209b, and 209c. The access option 209a corresponds to a "one-time rental" of the video resource and has a payment amount of $2.99. The access option 209b corresponds to "unlimited access" to the video resource for up to three devices and has a payment amount of $9.99. The access option 209c corresponds to a "monthly pass" to the video library providing access to additional premium content 130 and has a payment amount of $12.99. Radio buttons or other user interface components may be employed for selecting from among the access options 209.

The payment interface 206 includes a submit component 212 that may be employed to consummate the payment with a payment provider service 139 (FIG. 1). There may be multiple payment providers (e.g., "MyPayments" may be one of several possible payment providers), and the user may be able to select from among the multiple providers. A stored preference in the client 109 may indicate a preferred one of the multiple providers. The payment metadata 160 may indicate which payment provider(s) are supported, along with information employed to properly credit the payment amount to the operator of the network content server 118. In one embodiment, the submit component 212 may consummate the payment via a single selection. In other embodiments, additional information may need to be provided, for example, username, password, payment instrument information (e.g., credit card information, checking account information, etc.), and so on. In one embodiment, the payment may be authorized automatically by the browser 148, and no payment interface 206 need be rendered.

Figure 3:
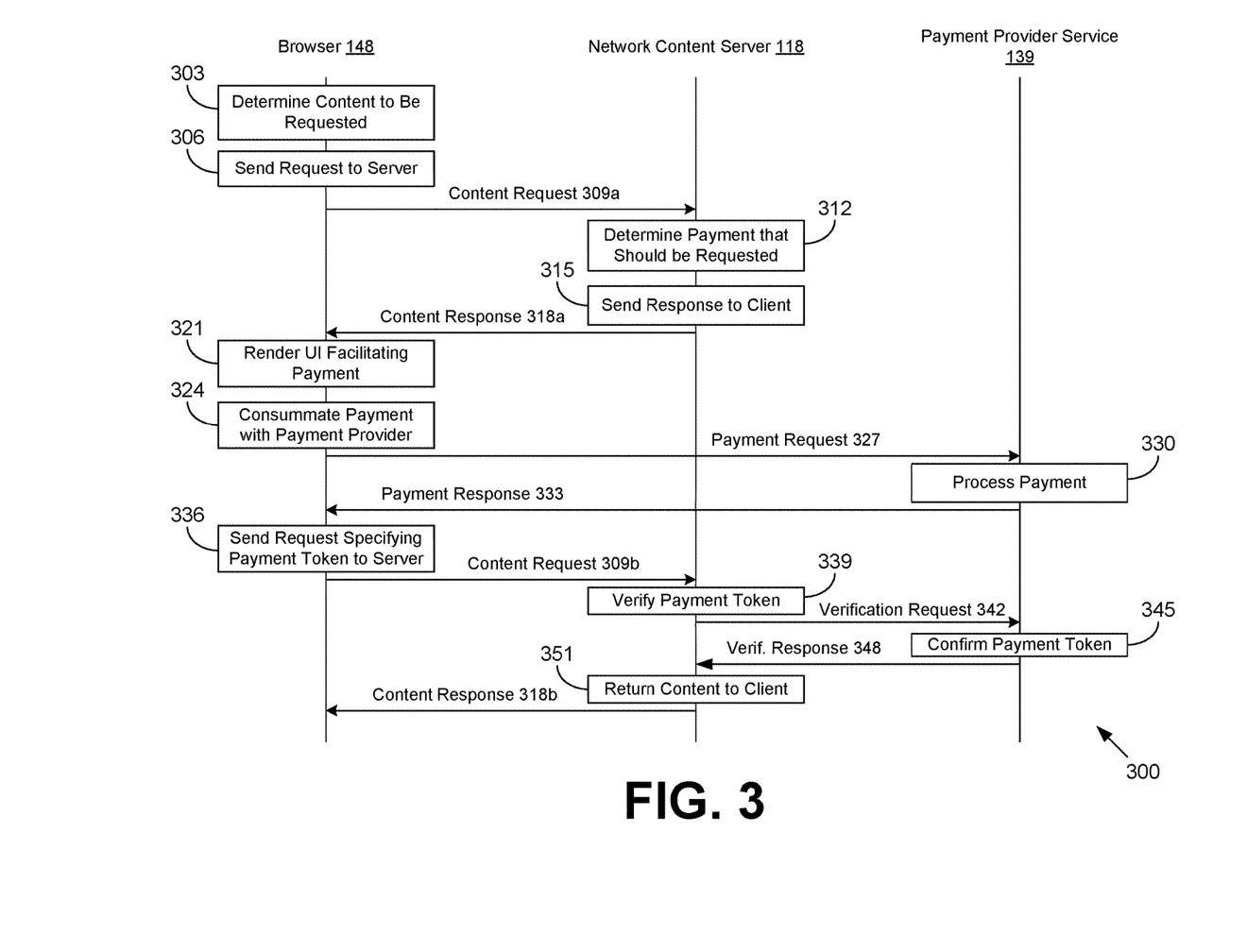
FIG. 3 is a sequence diagram illustrating one example of interaction between a browser executed in a client, a network content server executed in a computing environment, and a payment provider service executed in a computing environment in the networked environment of FIG. 1 according to various embodiments of the present disclosure.

Turning now to FIG. 3, shown is a sequence diagram 300 illustrating one example of interaction between a browser 148 executed in a client 109 (FIG. 1), a network content server 118 executed in a computing environment 103 (FIG. 1), and a payment provider service 139 (FIG. 1) executed in a computing environment 106 (FIG. 1) in the networked environment 100 (FIG. 1) according to various embodiments. It is understood that the sequence diagram 300 constitutes only one example of the many different types of interactions between the browser 148, network content server 118, and the payment provider service 139. Further, some or all of the tasks depicted in the sequence diagram 300 may be omitted or performed in different sequences as desired.

Beginning with box 303, the browser 148 determines content 121 (FIG. 1) to be requested. For example, a user may click on a hyperlink corresponding to the content 121 in the browser 148, or the user may manually enter a URL 203 (FIG. 2) in an address bar of the browser 148. In box 306, the browser 148 sends a content request 309a to the network content server 118 for the content 121. For example, the content request 309a may be an HTTP "GET" request.

In box 312, the network content server 118 determines that the content 121 corresponds to premium content 130 (FIG. 1) and that payment should be requested. In box 315, the network content server 118 sends a content response 318a to the browser 148. The content response 318a includes a response protocol header indicating that payment is sought for the content 121. Additional payment metadata 160 (FIG. 1) may be included in the content response 318a.

In box 321, the browser 148 renders a user interface 151 (FIG. 1) that facilitates payment in response to the content response 318a. In box 324, the browser 148 consummates the payment by sending a payment request 327 to a payment provider service 139. In box 330, the payment provider service 139 processes the payment and generates a payment-signifying token 157 (FIG. 1), which is returned to the browser 148 via a payment response 333. In box 336, the browser 148 sends a content request 309b for the content 121 to the network content server 118. The content request 309b includes the payment-signifying token 157 in a request protocol header. The content request 309b may also include a unique identifier 163 (FIG. 1).

In box 339, the network content server 118 verifies the payment-signifying token 157. For example, the network content server 118 may verify that the payment-signifying token 157 has been digitally signed by the payment provider service 139. Alternatively or additionally, the network content server 118 may send a verification request 342 to the payment provider service 139. The payment provider service 139 then confirms whether the payment-signifying token 157 is valid in box 345. The payment provider service 139 then returns a verification response 348 to the network content server 118. In some embodiments, the payment provider service 139 may also credit the payment to an account associated with the network content server 118 when the payment-signifying token 157 is valid. Assuming that the verification response 348 indicates that the payment-signifying token 157 is valid, the network content server 118 next returns the content 121 to the browser 148 in box 351 via a content response 318b. Thereafter, the sequence diagram 300 ends.

Figure 4A:
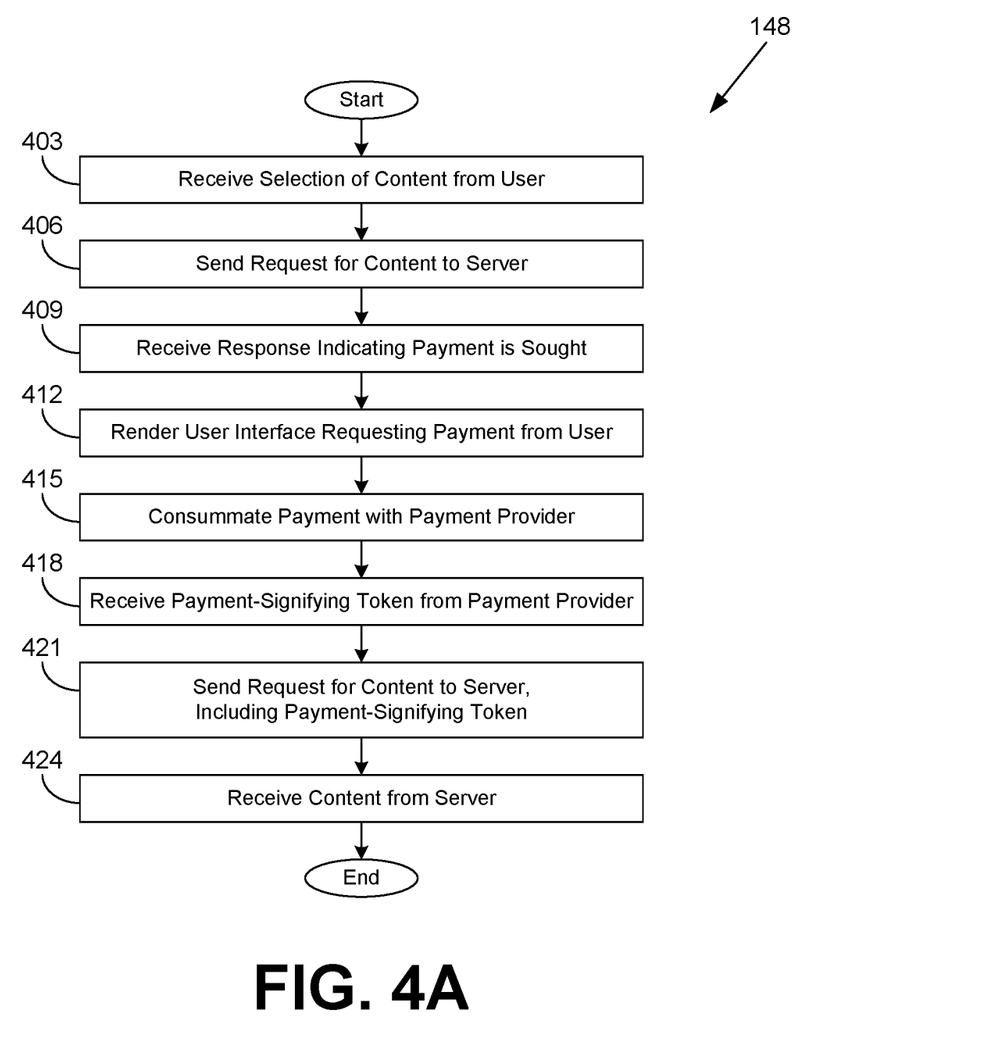
FIG. 4A is a flowchart illustrating one example of functionality implemented as portions of a browser executed in a client in the networked environment of FIG. 1 according to various embodiments of the present disclosure.

Referring next to FIG. 4A, shown is a flowchart that provides one example of the operation of a portion of the browser 148 according to various embodiments. It is understood that the flowchart of FIG. 4A provides merely an example of the many different types of functional arrangements that may be employed to implement the operation of the portion of the browser 148 as described herein. As an alternative, the flowchart of FIG. 4A may be viewed as depicting an example of steps of a method implemented in the client 109 (FIG. 1) according to one or more embodiments.

Beginning with box 403, the browser 148 receives a selection of content 121 from a user. In box 406, the browser 148 sends a request for the content 121 to the network content server 118 (FIG. 1). In box 409, the browser 148 receives a response from the network content server 118 indicating that a payment is sought to access the content 121. The response includes a response protocol header indicating that the payment is sought. The response also includes payment metadata 160 (FIG. 1) indicating payment amount, scope of access, duration of access, for one or more payment alternatives. In box 412, the browser 148 renders a user interface 151 requesting a payment from the user. After receiving confirmation of the payment from the user, the browser 148 consummates the payment with a payment provider service 139 (FIG. 1) in box 415.

In box 418, the browser 148 receives a payment-signifying token 157 (FIG. 1) from the payment provider service 139. In box 421, the browser 148 sends a second request for the content 121 to the network content server 118, this time including the payment-signifying token 157. In box 424, the browser 148 receives the content 121 from the network content server 118.

The browser 148 may be configured to present the payment-signifying token 157 automatically for subsequent requests for the content 121 and/or other content 121 for which the payment-signifying token 157 enables access. To this end, the payment-signifying token 157 may be stored in the client 109 in association with domain names or other identifiers corresponding to the network content server 118. The browser 148 may be configured to employ secure certificates to confirm the identity of the network content server 118. Thereafter, the portion of the browser 148 ends.

Figure 4B:
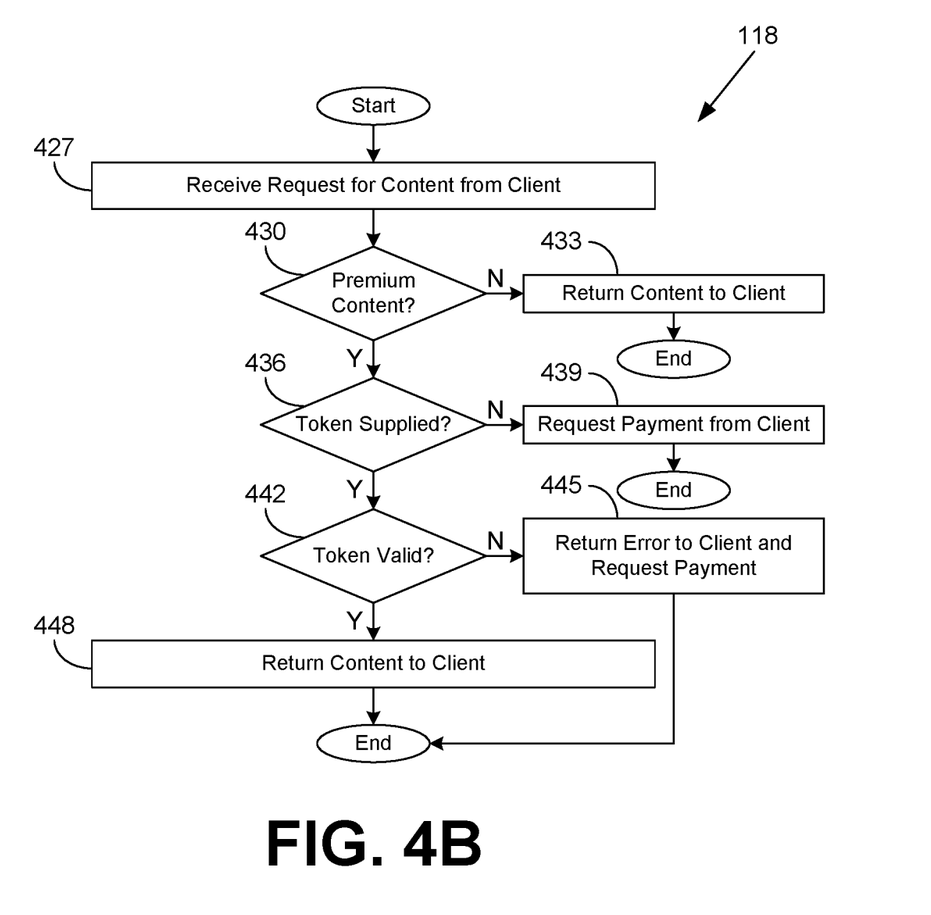
FIG. 4B is a flowchart illustrating one example of functionality implemented as portions of a network content server executed in a computing environment in the networked environment of FIG. 1 according to various embodiments of the present disclosure.

Turning now to FIG. 4B, shown is a flowchart that provides one example of the operation of a portion of the network content server 118 according to various embodiments. It is understood that the flowchart of FIG. 4B provides merely an example of the many different types of functional arrangements that may be employed to implement the operation of the portion of the network content server 118 as described herein. As an alternative, the flowchart of FIG. 4B may be viewed as depicting an example of steps of a method implemented in the computing environment 103 (FIG. 1) according to one or more embodiments.

Beginning with box 427, the network content server 118 receives a request for content 121 (FIG. 1) from a client 109 (FIG. 1). In box 430, the network content server 118 determines whether the requested content 121 corresponds to premium content 130 (FIG. 1). If the requested content 121 does not correspond to premium content 130, the network content server 118 moves to box 433 and returns the content 121 to the client 109. Thereafter, the portion of the network content server 118 ends.

If the requested content 121 does correspond to premium content 130, the network content server 118 moves from box 430 to box 436. In box 436, the network content server 118 determines whether a payment-signifying token 157 (FIG. 1) for the premium content 130 has been supplied in the request protocol headers. If a payment-signifying token 157 has not been supplied, the network content server 118 moves to box 439 and requests payment from the client 109. To this end, the network content server 118 returns a response with a protocol header indicating that payment should be made. The response may also include payment metadata 160 (FIG. 1) generated based at least in part on the content payment configuration data 124 (FIG. 1). Thereafter, the portion of the network content server 118 ends.

If, instead, a payment-signifying token 157 has been supplied, the network content server 118 moves from box 436 to box 442 and determines whether the payment-signifying token 157 is valid. To this end, the network content server 118 may verify a digital signature for the payment-signifying token 157, send a verification request to the payment provider service 139 (FIG. 1), refer to previous accesses in the access log 127 (FIG. 1), or perform other verification functions.

In this way, the network content server 118 may ensure that content 121 is not accessed beyond a predefined number of times, beyond a specified duration from a first access, or from beyond a predefined number of clients 109. If the payment-signifying token 157 is determined not to be valid, the network content server 118 moves to box 445 and returns an error to the client 109 and requests payment. In some embodiments, to reduce latency, verification may be performed after granting access to the content 121, with the access later being revoked if the payment-signifying token 157 is invalid. Thereafter, the portion of the network content server 118 ends.

If the payment-signifying token 157 is indeed valid, the network content server 118 moves from box 442 to box 448. In box 448, the network content server 118 returns the requested content 121 to the client 109. Thereafter, the portion of the network content server 118 ends.

Figure 4C:
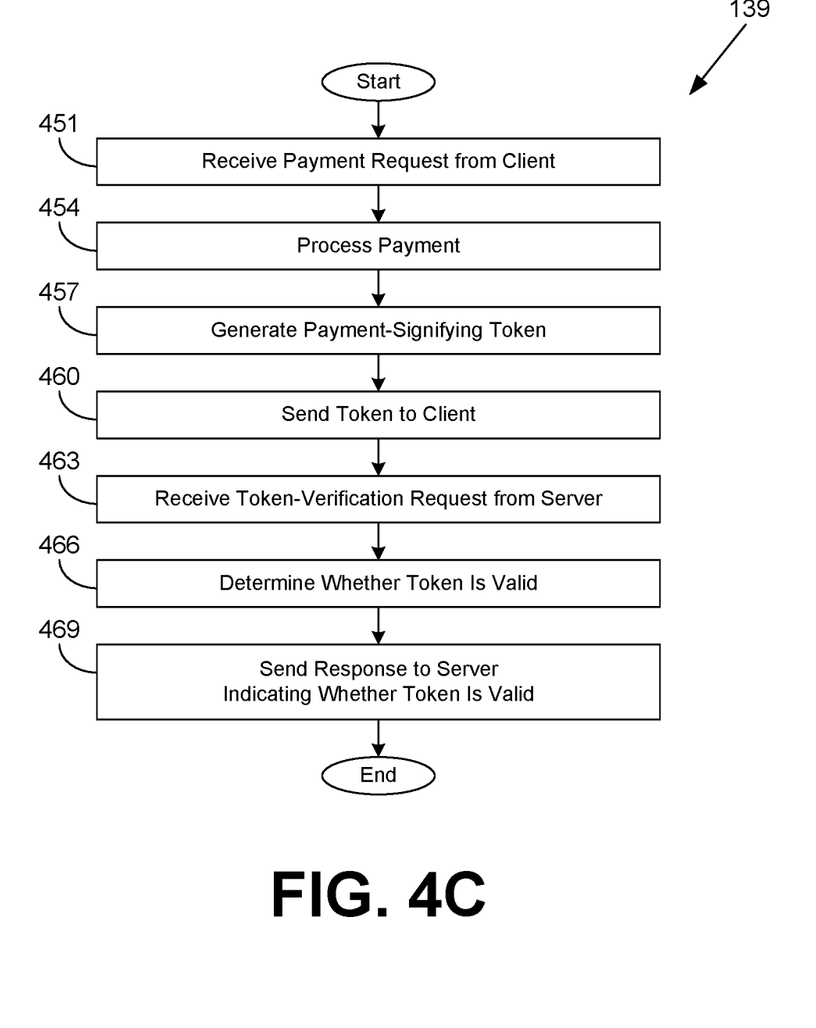
FIG. 4C is a flowchart illustrating one example of functionality implemented as portions of executed in a payment provider service in the networked environment of FIG. 1 according to various embodiments of the present disclosure.

Moving on to FIG. 4C, shown is a flowchart that provides one example of the operation of a portion of the payment provider service 139 according to various embodiments. It is understood that the flowchart of FIG. 4C provides merely an example of the many different types of functional arrangements that may be employed to implement the operation of the portion of the payment provider service 139 as described herein. As an alternative, the flowchart of FIG. 4C may be viewed as depicting an example of steps of a method implemented in the computing environment 106 (FIG. 1) according to one or more embodiments.

Beginning with box 451, the payment provider service 139 receives a payment request from a client 109 (FIG. 1). In box 454, the payment provider service 139 processes the payment. In box 457, the payment provider service 139 generates a payment-signifying token 157 (FIG. 1), which may be digitally signed by the payment provider service 139. The payment provider service 139 sends the payment-signifying token 157 to the client 109 in box 460.

In box 463, the payment provider service 139 receives a token-verification request for a payment-signifying token 157 from a network content server 118 (FIG. 1). In box 466, the payment provider service 139 determines whether the payment-signifying token 157 is valid. To this end, the payment provider service 139 may refer to payments data 142 (FIG. 1) to determine whether the payment-signifying token 157 is expired, used, exhausted, stolen, etc. In box 469, the payment provider service 139 sends a response to the network content server 118 indicating whether the payment-signifying token 157 is valid. Thereafter, the portion of the payment provider service 139 ends.

Figure 5:
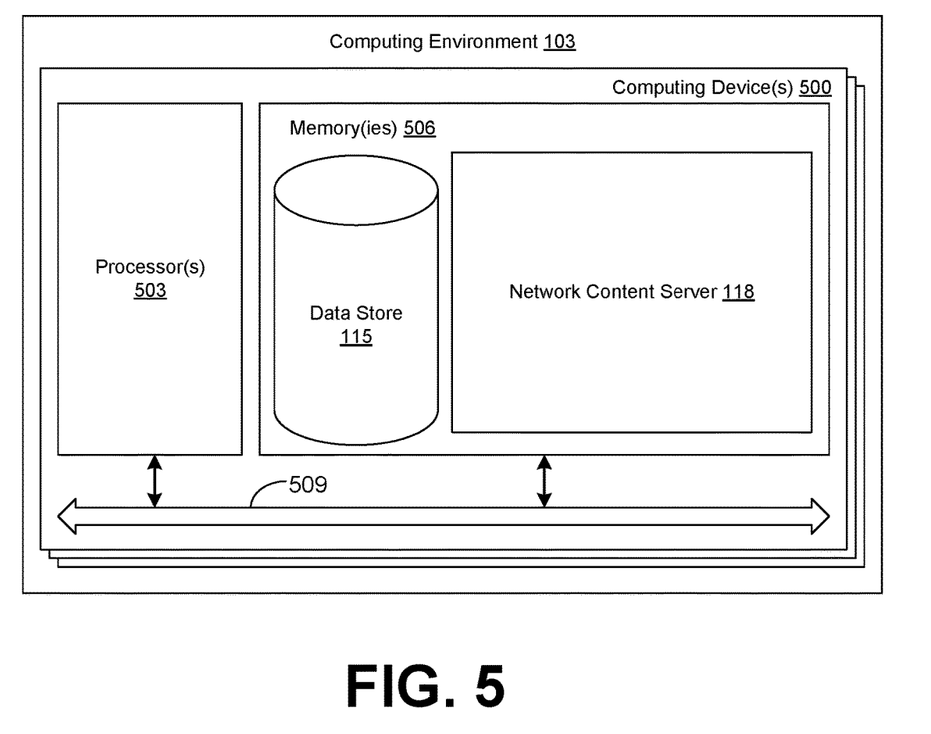
FIG. 5 is a schematic block diagram that provides one example illustration of a computing environment employed in the networked environment of FIG. 1 according to various embodiments of the present disclosure.

With reference to FIG. 5, shown is a schematic block diagram of the computing environment 103 according to an embodiment of the present disclosure. The computing environment 103 includes one or more computing devices 500. Each computing device 500 includes at least one processor circuit, for example, having a processor 503 and a memory 506, both of which are coupled to a local interface 509. To this end, each computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 is the network content server 118 and potentially other applications. Also stored in the memory 506 may be a data store 115 and other data. In addition, an operating system may be stored in the memory 506 and executable by the processor 503. The computing environment 106 (FIG. 1) may be implemented similarly to the computing environment 103.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and/or multiple processor cores and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the network content server 118, the browser 148 (FIG. 1), the payment provider service 139 (FIG. 1), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 4A-4C show the functionality and operation of an implementation of portions of the network content server 118, the browser 148, and the payment provider service 139. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 4A-4C show a specific order of execution, it is understood that the order of execution may differ from that which is depicted. For example, the order of execution of two or more blocks may be scrambled relative to the order shown. Also, two or more blocks shown in succession in FIGS. 4A-4C may be executed concurrently or with partial concurrence. Further, in some embodiments, one or more of the blocks shown in FIGS. 4A-4C may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the network content server 118, the browser 148, and the payment provider service 139, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, wherein when executed, the program causes the at least one computing device to at least:
   send a first request for content to a hypertext transfer protocol (HTTP) server;
   receive a response to the first request that includes an HTTP payment required header requesting a payment for access to the content, the response further including metadata indicating a payment amount, a scope of content access to be granted in response to the payment, and a duration of access to be granted in response to the payment;
   render a user interface that facilitates consummating the payment to a payment provider, the user interface indicating the payment amount, the scope of content access, and the duration of access;
   receive a payment-signifying token from the payment provider;
   send a second request for the content to the HTTP server, the second request including an HTTP request header specifying the payment-signifying token; and
   receive the content from the HTTP server in response to the second request.

2. The non-transitory computer-readable medium of claim 1, wherein the program corresponds to a browser.

3. The non-transitory computer-readable medium of claim 1, wherein the program corresponds to a plug-in for a browser.

4. A method, comprising:
   sending, by a computing device, a first request for content to a network content server;
   receiving, by the computing device, a response protocol header indicating that a payment is sought for the content in response to the first request;
   executing, by the computing device, payment manager code integral to a browser or a browser plug-in in response to receiving the response protocol header;
   receiving, by the payment manager code executed by the computing device, a payment-signifying token from a payment provider in response to consummating the payment;
   sending, by the computing device, a second request for the content to the network content server, the second request including a request protocol header specifying the payment-signifying token; and
   receiving, by the computing device, the content from the network content server in response to the second request.

5. The method of claim 4, further comprising rendering, by the computing device, a user interface requesting the payment from a user in order to access the content.

6. The method of claim 5, further comprising:
   determining, by the computing device, whether the payment-signifying token has expired; and
   wherein the user interface indicates that the payment-signifying token has expired when the payment-signifying token has expired.

7. The method of claim 5, further comprising:
   receiving, by the computing device, a response from the network content server in response to the second request, the response indicating that the payment-signifying token is invalid to access the content;
   wherein the user interface indicates that the payment-signifying token is invalid to access the content.

8. The method of claim 4, wherein the second request further includes a unique identifier associated with the computing device.

9. The method of claim 4, wherein receiving the response protocol header indicating that the payment is sought for the content further comprises receiving, by the computing device, metadata specifying a payment amount for the payment, a scope of content access to be granted in response to the payment, and a duration of access to the content to be granted in response to the payment.

10. The method of claim 9, wherein rendering the user interface further comprises rendering, by the computing device, a user interface requesting the payment from a user in order to access the content based at least in part on the payment amount, the scope of content access, and the duration of access.

11. The method of claim 4, further comprising sending, by the computing device, a third request for the content to the network content server after the second request, the third request including the request protocol header specifying the payment-signifying token.

12. The method of claim 4, further comprising sending, by the computing device, a third request for other content to the network content server, the third request including the request protocol header specifying the payment-signifying token, the payment-signifying token being associated with a scope of access that includes the content and the other content.

13. The method of claim 4, wherein the request protocol header indicating that the payment is sought for the content is a hypertext transfer protocol (HTTP) payment required header.

14. A system, comprising:
a computing device; and
at least one program executable in the computing device, the at least one program, wherein when executed the at least one program causes the computing device to at least:
send a first request for content to a network content server;
receive a response protocol header indicating that a payment is sought for the content in response to the first request;
receive a payment-signifying token from a payment provider in response to consummating the payment;
send a second request for the content to the network content server, the second request including a request protocol header specifying the payment-signifying token; and
receive the content from the network content server in response to the second request.

15. The system of claim 14, wherein the response protocol header indicating that the payment is sought is a hypertext transfer protocol (HTTP) payment required header.

16. The system of claim 14, wherein when executed the at least one program further causes the computing device to at least render a user interface requesting the payment from a user in order to access the content.

17. The system of claim 14, wherein the second request further includes a unique identifier associated with the computing device.

18. The system of claim 14, wherein when executed the at least one program further causes the computing device to at least receive metadata specifying a payment amount for the payment, a scope of content access to be granted in response to the payment, and a duration of access to the content to be granted in response to the payment.

19. The system of claim 14, wherein when executed the at least one program further causes the computing device to at least send a third request for other content to the network content server, the third request including the request protocol header specifying the payment-signifying token, the payment-signifying token being associated with a scope of access that includes the content and the other content.

20. The system of claim 14, wherein the at least one program comprises a payment manager integral to a browser or a browser plug-in.

* * * * *